March 18, 1941. A. RONNING 2,235,045

MANUALLY PROPELLED VEHICLE

Original Filed May 21, 1938

INVENTOR
ADOLPH RONNING
BY
ATTORNEY

Patented Mar. 18, 1941

2,235,045

UNITED STATES PATENT OFFICE 2,235,045

MANUALLY PROPELLED VEHICLE

Adolph Ronning, Minneapolis, Minn.

Original application May 21, 1938, Serial No. 209,283. Divided and this application March 22, 1940, Serial No. 325,475

4 Claims. (Cl. 280—48)

This invention relates generally to manually propelled vehicles and more particularly to that type of vehicle comprising a wheel supported and box-like body used in the transport of small articles such as boxes, baggage, and the like.

The primary object of my invention is to provide a vehicle or truck of this kind embodying at least two caster wheels and at least one steerable wheel with means for conveniently adjusting the latter wheel about an upright steering axis to steer the vehicle in any desired direction. Another object is to provide a vehicle steering means of this kind which includes as the operating member a handle which serves also to propel the vehicle and which is arranged to operate the steering mechanism when the vehicle is being either pushed or pulled along the floor. Another object is to provide novel and conveniently operative means for adjusting and supporting the handle relative to the body or box when the vehicle is being pushed by said handle and for releasing the handle so that it may be swung outward to act as a tongue for pulling the vehicle.

These and other more detailed and specific objects will be disclosed in the course of the following specification, reference being had to the accompanying drawing, in which—

Figure 1:
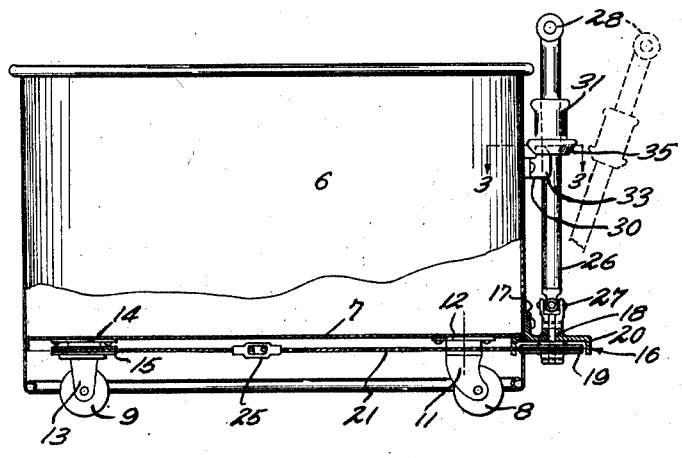
Fig. 1 is a side view of a transport vehicle or truck constructed in accordance with my invention, the lower portion thereof being broken away and shown in section to better disclose the construction of the steering mechanism.
Figure 3:
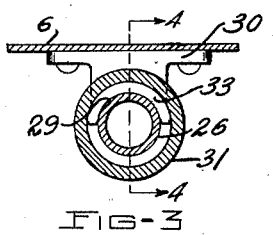
Fig. 3 is an enlarged horizontal section taken along the line 3—3 in Fig. 1.
Figure 4:
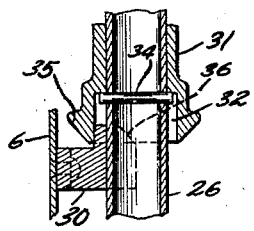
Fig. 4 is a vertical section taken along the line 4—4 in Fig. 3.
Figure 2:
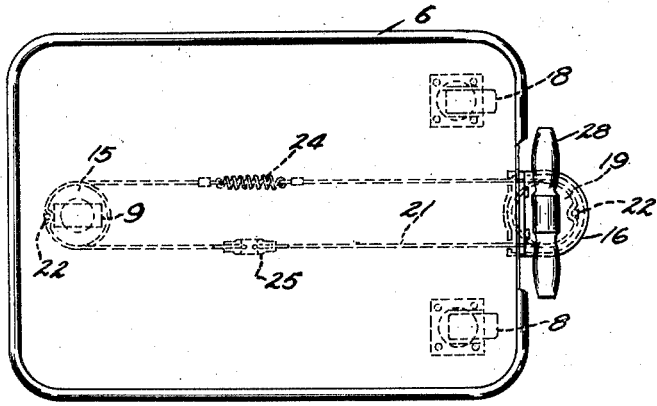
Fig. 2 is a plan view of the vehicle shown in Fig. 1.

This application is a division of my parent application for patent on a Manually propelled vehicle Serial No. 209,283 filed May 21, 1938.

Referring now more particularly to the drawing, the vehicle of the type shown is seen to comprise a substantially rectangular box-like frame or body 6 having a closed bottom 7 which is supported upon transversely spaced and rearwardly located caster wheels 8 and upon a single forwardly located steerable wheel 9. The side walls of the body 6 preferably overhang the bottom 7 as represented at 10 in order to partially conceal the wheels 8 and 9.

The forks 11 of the caster wheels 8 are journaled in brackets or bearings 12 secured to the bottom 7 and of course may oscillate freely about vertical axes in order to caster freely in any direction. The forwardly located steerable wheel 9 is mounted in a fork on a bearing or bracket 14 in order to oscillate about a vertical axis and this fork carries a sheave 15 rigidly mounted with respect thereto. A drum-like bracket 16 is secured by an ear 17 to the end of the body 6 remote from the wheel 9. This bracket rotatably supports a short upright shaft 18 upon which is secured a sheave 19 arranged to operate freely beneath the bracket and within the annular depended flange 20 thereof. The sheaves 15 and 19 are located in the same horizontal plane and a cable 21 is trained around them in such manner that rotation of the shaft 18 about its axis will oscillate the fork 13 and cause steering movement of the wheel 9.

Figure 5:
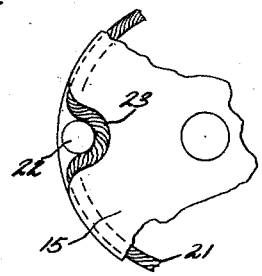
Fig. 5 is an enlarged fragmentary plan view of one of the sheaves used in the steering mechanism and showing the means used for securing the cable thereto.

The cable 21 is located with respect to the sheaves 15 and 19 by pins 22 which as clearly shown in Fig. 5 are anchored in the sheaves and crimp the cable into adjacent recess as represented at 23. The long reaches of the cable between the sheaves are provided respectively with a retractile coil spring 24 and a turnbuckle 25 in order to hold the cable taut at all times.

A handle 26 preferably although not necessarily made of round tubular stock is connected by means of a universal joint 27 to the upper end of the shaft 18 and at its upper end has a cross bar or grip member 28. This handle 26 may stand upwardly in vertical position at the end of the body 6 and in this position engages the rounded notch 29 of a catch member 30 secured to the body. A collar 31 is slidably mounted on a handle 26 and at its lower end has an annular recess 32 which may fit over and engage an arcuate flange 33 upstanding from said bracket 30. A cross bar 34 mounted diametrically through the handle 26 limits the downward movement of the collar 31 as clearly shown.

From the foregoing, it will be apparent that the operator may propel the vehicle along the floor by grasping the cross bar 28 and by manipulation of this bar he may oscillate the handle 26 to steer the wheel 9 through action of the sheaves 15 and 19 and the cable 21. As the vehicle is thus steered to either side, the caster wheels 8 will of course turn as required to properly track with the course of the vehicle.

It will be of convenience to the operator if the position of the cross bar 28 transversely to the normal straight-ahead line of travel of the vehicle will coincide with the proper position of the wheel 9 for such travel. The relative angular positions of the sheaves 15 and 19 may be adjusted for thus lining up the cross bar by virtue of the take-up afforded by turnbuckle 25 as will be clearly evident.

The upright position of the handle 26 as thus far described is convenient for pushing the vehicle ahead of the operator. It is sometimes more convenient, however, to pull the vehicle in a trailing position and for this purpose I have provided the universal joint 27 and the large mechanism constituted by the catch member 30 and collar 31. To release the handle, the operator may oscillate the collar 31 upwardly until it clears the flange 33 whereupon the handle is free to be swung outwardly to any desired angular position as represented by the dotted lines in Fig. 1. The handle will of course continue to serve as a means for rotating the sheaves 15 and 19 for steering purposes. When the collar 31 is released after having cleared the catch member 30, it will of its own weight fall back to an original position against the stop pin 34 and to then restore the handle 26 to upright position the operator need only swing it upwardly to that position. For this purpose the lower diametrically enlarged end of the collar is beveled off in a downward direction as indicated at 35 and the extremities of the flange 33 are angularly cut as indicated at 36 so that the collar will ride upwardly over the flange until it may drop downwardly into locking engagement therewith.

From the foregoing, it will be apparent that I have provided a very simple and convenient handle actuated steering means for a small hand operated vehicle of the type so universally used and one which requires no readjustment of the operator's hand from normal position for propelling the vehicle. It is to be understood that I may vary from the specific structure shown so long as such variations fall within the scope of the appended claims.

Having thus fully described my invention, what I claim is new and desire to secure by Letters Patent, is:

1. A hand propelled vehicle comprising, a body supported by a plurality of caster wheels and a single dirigibly mounted wheel, a sheave connected with said dirigible wheel and movable therewith about an upright steering axis, a sheave journaled on the body in spaced relation to said dirigible wheel, a cable trained around the sheaves, and a handle connected to the last mounted sheave for propelling the vehicle and for rotating the sheaves to steer the said dirigible wheel.

2. A hand propelled vehicle comprising, a body supported by a plurality of caster wheels and a single dirigibly mounted wheel, a sheave connected with said dirigible wheel and movable therewith about an upright steering axis, a sheave journaled on the body in spaced relation to said dirigible wheel, a cable trained around the sheaves, a handle connected to the last mounted sheave for propelling the vehicle and for rotating the sheaves to steer the said dirigible wheel, and means on the sheaves for crimping the cable and locking the same with respect to said sheaves.

3. A hand propelled vehicle comprising, a body supported by a plurality of wheels mounted for angling movement about vertical axes, a sheave connected with one wheel for movement therewith about said axis, another sheave rotatably mounted on the body, a cable trained over the sheaves for transmitting motion therebetween, a handle connected to the last mentioned sheave and supported in upright position for propelling the vehicle and for turning the sheaves to steer the wheel connected therewith, a cross member on an upper end of the handle, and means for adjusting the steerable wheel to a position for straight-ahead travel of the vehicle when said cross member is transversely disposed with respect to the line of travel.

4. A hand propelled vehicle comprising, a body supported by a plurality of wheels, at least one of said wheels being mounted for steering movements, a shaft journaled at a lower portion of the body, means operatively connecting the said shaft with the steerable wheel for steering said wheel in response to oscillation of the shaft, a handle flexibly connected at a lower end to the shaft for oscillating the same, a catch member secured to the body above the shaft for engagement by the handle in an upright position thereof, a flange along the catch member for embracing a portion of the handle, a collar slidably mounted on the handle for releasable engagement at a lower end with the said flange, the said handle being movable outwardly with respect to the body by upwardly disengaging the collar from the flange and meeting surfaces of the flange and collar being beveled off to automatically reengage the collar with the catch member as the handle is returned to an upright position.

ADOLPH RONNING.